United States Patent Office 3,679,620
Patented July 25, 1972

3,679,620
UNIFORM ETHYLENE/VINYL ACETATE/N-METHYLOL ACRYLAMIDE TERPOLYMER DISPERSIONS
Aleksander Beresniewicz, Wilmington, Del., assignor to E. I. du Pont de Nemours and Company, Wilmington, Del.
No Drawing. Filed May 1, 1970, Ser. No. 33,876
Int. Cl. C08f 15/40
U.S. Cl. 260—29.6 TA                         5 Claims

ABSTRACT OF THE DISCLOSURE

A uniform ethylene/vinyl acetate/N-methylol acrylamide terpolymer is provided. A latex coating composition comprising an aqueous medium having the terpolymer colloidally suspended therein is provided. A coated textile fabric having a coating comprising the terpolymer is provided. And an improvement in the process for preparing an ethylene/vinyl acetate/N-methylol acrylamide terpolymer wherein the monomers are copolymerized in an aqueous dispersion system under ethylene pressure is provided. The improvement comprises maintaining the level of unreacted vinyl acetate monomer in the aqueous dispersion system at about 5–25 weight percent based on the total weight of the system at a given time during a substantial portion of the polymerization, continuously adding N-methylol acrylamide and vinyl acetate to the aqueous dispersion system in a substantially constant ratio and at a rate substantially the same as the rate of polymerization and continuously adding N-methylol acrylamide after completion of vinyl acetate addition in order to form a terpolymer having a uniform distribution of the N-methylol acrylamide. The terpolymer formed by the process of this invention has improved curability over prior art ethylene/vinyl acetate/N-methylol acrylamide terpolymers and, accordingly, provides superior coatings for textiles such as woven fabrics.

BACKGROUND OF THE INVENTION

Field of invention

This invention relates generally to ethylene/vinyl acetate/N-methylol acrylamide terpolymer dispersions which form coatings that are water-resistant and solvent-resistant and more particularly to improved methods for preparing vinyl acetate/ethylene/N-methylol acrylamide terpolymers.

Description of prior art

Terpolymers of vinyl acetate, ethylene and N-methylol acrylamide and processes for preparing them are disclosed in Lindemann et al. U.S. 3,345,318. These terpolymers can be used to provide a water-resistant and solvent-resistant coating finish which, when applied to woven fabrics, gives them a desirable body and drape.

The manner in which these terpolymers are prepared is critical. If the process employed causes the monomers to be copolymerized in a non-uniform fashion, there are undesirable results. For example, since cross-linking occurs through the N-methylol acrylamide groups, if the terpolymer chains contain differing amounts of copolymerized N-methylol acrylamide, the terpolymer coating composition will not uniformly cross-link upon curing. As a result, when a coated fabric is subsequently subjected to washing or cleaning operations, part of the coating may loosen or dissolve. Accordingly, in order to prevent a subsequent loss of coating, when relatively non-uniform terpolymers are present in the coating composition, larger amounts of terpolymer and larger amounts of N-methyl acrylamide in terpolymer preparation must be used than when relatively uniform terpolymers are present in the coating composition.

In addition to the cost factor (N-methylol acrylamide is appreciably more expensive than vinyl acetate and ethylene), the use of larger amounts of N-methylol acrylamide is further disadvantageous in that when a large amount of N-methylol acrylamide is copolymerized, it is very difficult to control the flexibility of the resulting terpolymer composition. Thus, when using known polymerization techniques by which only relatively non-uniform terpolymers can be formed, it is very difficult if not impossible to obtain a vinyl acetate/ethylene/N-methylol acrylamide terpolymer which will provide a coating composition having the sought after flexibility and softness as well as the desired washing and dry cleaning resistance.

SUMMARY OF THE INVENTION

According to the present invention, there is provided a process for preparing a uniform ethylene/vinyl acetate/N-methylol acrylamide terpolymer which does not exhibit the above recited disadvantages. This process is an improvement of the process for preparing vinyl acetate/ethylene/N-methylol acrylamide terpolymers wherein the monomers are copolymerized in an aqueous dispersion system under ethylene pressure in the presence of an emulsifying agent. The improvement comprises maintaining the level of unreacted vinyl acetate monomer in the aqueous dispersion system at about 5–25 weight percent based on the total weight of the system at any given time during a substantial portion of the polymerization, continuously adding N-methylol acrylamide and vinyl acetate to the aqueous dispersion system in a substantially constant ratio and at a rate substantially the same as the rate of polymerization and continuously adding N-methylol acrylamide after completion of vinyl acetate addition in order to form a terpolymer having a uniform distribution of the N-methylol acrylamide.

There is also provided the uniform ethylene/vinyl acetate/N-methylol acrylamide terpolymer which is formed by the above process.

There is also provided a coated fabric having on at least one face thereof a coating comprising the above uniform terpolymer.

And there is also provided a latex composition effective for application to a textile fabric to form a resin coating thereon comprising an aqueous medium having colloidally suspended therein the above uniform terpolymer.

DESCRIPTION OF PREFERRED EMBODIMENTS

Ethylene/vinyl acetate/N-methylol acrylamide terpolymers and processes for their preparation in aqueous dispersion systems are described in U.S. Pat. 3,345,318. Such disclosure is hereby incorporated by reference.

In carrying out the process of this invention, ethylene, vinyl acetate and N-methylol acrylamide are copolymerized in an aqueous dispersion system under pressures not exceeding 100 atmospheres in the presence of a catalyst and at least one emulsifying agent, the aqueous system being maintained, by a suitable buffering agent, at a pH of 2–6. The catalyst and emulsifying agent are continuously added to the dispersion system during a substantial portion of the polymerization. Suitable catalytic systems are described in column 2, of U.S. Pat. 3,345,318.

Emulsifying agents which are suitable for use may be non-ionic or anionic. Various non-ionic emulsifying agents are described in columns 3 and 4 of U.S. Pat. 3,345,318. Suitable anionic emulsifying agents can be selected from any of the commonly used commercially available anionic emulsifying agents, including the sulfates, phosphates, sulfonates and sulfosuccinates. When vinyl acetate monomer level in the dispersion system is maintained between about 15–25 weight percent, it is preferable to employ an anionic emulsifying agent.

High molecular weight copolymers are prepared utilizing relatively high temperatures, e.g., 70–85° C. However, it is generally advantageous to maintain the temperature below about 85° C.

In carrying out the polymerization, the level of unreacted vinyl acetate monomer in the dispersion system should be maintained at about 5–25 (preferably 15–25) weight percent based on the total weight of the system at any given time during a substantial portion of the polymerization, e.g., from the start of polymerization until completion of vinyl acetate addition. The lower limit is prescribed to insure an adequate supply of vinyl acetate monomer in the dispersion system for polymerization. The upper limit is prescribed to enable satisfactory control over the polymerization reaction, e.g., rate of polymerization and reaction temperature.

The N-methylol acrylamide and vinyl acetate are continuously added to the dispersion system in a substantially constant ratio at a rate substantially the same as the rate of polymerization. After vinyl acetate addition is completed, N-methylol acrylamide is continuously added to the dispersion system. This results in N-methylol acrylamide being uniformly distributed throughout the polymer. Due to different polymerization rates of the monomers in the presence of each other (N-methylol acrylamide being faster than vinyl acetate), it is necessary to continuously add N-methylol acrylamide after vinyl acetate addition in order to insure the presence of N-methylol acrylamide monomer in the system during polymerization of the finally added amounts of vinyl acetate monomer.

In order to obtain a more highly uniform distribution of N-methylol acrylamide in the terpolymer, the N-methylol acrylamide should be added in decreasing amounts after completion of vinyl acetate addition. And it is most preferred to add the N-methylol acrylamide in an amount decreasing proportionally to the amount of vinyl acetate monomer remaining in the dispersion system at a rate substantially the same as the rate of N-methylol acrylamide polymerization.

Improved characteristics of the emulsion formed by the process of this invention, e.g., less dilution sludge and an improved emulsion appearance, are provided by adding the N-methylol acrylamide to the dispersion system during the polymerization as a dilute aqueous solution. It is preferred that the concentration of N-methylol acrylamide in this solution be less than about 45 weight percent and most preferably between about 10 to 30 weight percent. These improved characteristics are illustrated by Example III and Table III.

The terpolymer dispersion system resulting from the process of this invention can be applied to textile shaped articles. This polymeric latex can be dried (cured) to remove its liquid component to leave upon the shaped article a deposit of a water-resistant and solvent-resistant polymeric coating. Such coating gives body, fullness, drape or like characteristics to the shaped article, e.g., an upholstered fabric. Particularly suitable for application of the latex to the shaped article is the licker-on apparatus, wherein a trough contains the latex to be applied and is fitted with a rotatable roll, which is partially immersed in the latex.

The solids content of the latex itself can vary but it is generally advantageous to have a solids content of about 50%. If the latex, as produced, has a higher solids content, or if an even lower solids content is desired the appropriate solids content can readily be attained by appropriate dilution of the latex with water.

The following examples will serve to illustrate the invention. All parts and percentages are by weight unless otherwise indicated.

EXAMPLE I

The following ingredients were charged into a 5 gallon stainless steel pressure reactor equipped with temperature controls and an agitator:

| | |
|---|---|
| Water _____pounds__ | 13.5 |
| "Aerosol" MA–80 _____g__ | 120 |
| "Aerosol" OT–75 _____g__ | 193 |
| 3% aqueous "Natrosol" 300 L _____g__ | 370 |
| Dibasic ammonium phosphate _____g__ | 20 |
| Vinyl acetate _____g__ | 630 |

The reactor was purged with nitrogen, the contents heated to 72° C. and the ethylene pressure in the reactor was brought to 500 p.s.i. The agitator was set at 350 r.p.m. When the temperature and pressure inside the reactor reached 72° C. and 500 p.s.i., respectively, 40 g. of ammonium persulfate, dissolved in 380 g. of water, were introduced through a separate line over a period of 25 minutes. As soon as there was evidence of an exotherm inside the reactor, three continuous feeds were started. They were:

Feed I.—Vinyl acetate in an amount of 16 pounds was introduced at a uniform rate over a period of 120 minutes.

Feed II.—A solution containing 1400 g. of 3% aqueous "Natrosol" 300 L, 240 g. of "Aerosol" MA–80 and 25 g. of dibasic ammonium phosphate was introduced at a uniform rate over a period of 160 minutes.

Feed III.—A 30% aqueous N-methylol acrylamide solution was introduced at a uniform rate of 8.0 cc./min. for 130 minutes and then at a uniform rate of 4.0 cc./min. for 20 minutes.

Throughout the polymerization, the ethylene pressure was maintained at 500 p.s.i. As soon as the exotherm was substantially decreased (about 2½ hours from the start of the continuous feeds), the reactor temperature was raised to 80° C. and was kept there for 45 minutes. At this time the polymerization was substantially completed.

This dispersion had a solids content of 51.8 weight percent, a pH of 4.8 and a Brookfield viscosity of 95 centipoises at 25° C. (60 r.p.m.). The dispersed polymer had a 14.1 wt. percent of ethylene, a 3.5 wt. percent of N-methylol acrylamide, and 82.4 wt. percent of vinyl acetate, and an inherent viscosity of 0.94 as shown in Table I. Curability of the dispersion was judged to be excellent as shown in Tables I and II.

EXAMPLE II

The following ingredients were charged to a 20 gallon stainless steel pressure reactor equipped with temperature controls and an agitator:

| | |
|---|---|
| Water _____pounds__ | 41.0 |
| Vinyl acetate _____do___ | 5.2 |
| Potassium persulfate _____g__ | 150 |
| "Aerosol" MA–80 _____g__ | 160 |
| "Aerosol" OT–75 _____g__ | 450 |
| Sodium bicarbonate _____g__ | 30 |

The reactor was purged with nitrogen, the agitator set at 300 r.p.m., the temperature was raised to 75° C. and the ethylene pressure was brought up to 500 p.s.i. Two feeds were then pumped into the reactor at a uniform rate, while maintaining the reaction temperature at 75° C. and the pressure at 500 p.s.i. The feeds were:

Feed I.—A solution containing 8.0 pounds of 3% aqueous "Natrosol" 300 L, 10.0 pounds of water, 2.0 pounds of "Aerosol" MA–80, 3.7 pounds of aqueous 60% N-methylol acrylamide solution and 50.0 g. of sodium bicarbonate was introduced at a uniform rate over 135 minutes.

Feed II.—Vinyl acetate in an amount of 47.0 pounds was introduced at a uniform rate over 120 minutes.

Immediately after Feed I is in the reactor, Feed III was pumped into the reactor over a period of 4–5 minutes, it consisted of:

| | G. |
|---|---|
| "Triton" X-305 | 535 |
| Water | 1360 |
| Sodium bicarbonate | 10 |

When Feed III was in the reactor, the reaction temperature was raised to 85° C. and maintained for 30 minutes. By this time, the polymerization was essentially completed. Throughout the polymerization, the ethylene pressure was maintained at 500 p.s.i.

The dispersion had a solids content of 50.4 weight percent, a pH of 5.0 and a Brookfield viscosity of 150 centipoises at 25° C. (60 r.p.m.). The dispersed polymer had a 14.0 wt. percent of ethylene, a 3.5 wt. percent of N-methylol acrylamide, an 82.5 wt. percent of vinyl acetate and an inherent viscosity of 1.20 as shown in Table I. Curability of the dispersion was judged to be good as shown in Tables I and II.

COMPARATIVE EXAMPLE

This example illustrates the preparation of an ethylene/vinyl acetate/N-methylol acrylamide terpolymer wherein no N-methylol acrylamide is added to the dispersion system after vinyl acetate addition is completed.

The polymerization was carried out essentially the same as in Example II, except that Feeds I and II were both introduced over a period of 120 minutes. Also 128 g. of ammonium persulfate were used instead of 150 g. of potassium persulfate. A separate feed of 43 g. of sodium metabisulfite dissolved in 1460 g. of water was introduced into the reactor at a uniform rate over a period of 135 minutes. The resulting emulsion had a 4.0 weight percent of N-methylol acrylamide based on the total weight of the terpolymer. Other minor differences in the surfactant and buffer systems are apparent from data summarized in Table I.

The dispersion had a solids content of 49.7 weight percent, a pH of 3.7 and a Brookfield viscosity of 350 centipoises at 25° C. (60 r.p.m.). The dispersed polymer had a 13.8 wt. percent of ethylene, a 4.0 wt. percent of N-methylol acrylamide, an 82.2 wt. percent of vinyl acetate and an inherent viscosity of 1.18 as shown in Table I. Curability of the dispersion was judged to be fair as shown in Tables I and II.

Polymerization conditions and dispersion and terpolymer properties of Examples I–II and the Comparative Example are compared in Table I.

EXAMPLE III

Ethylene/vinyl acetate/N-methylol acrylamide terpolymer dispersions were prepared essentially the same as in Example II. Important process variables and emulsion characteristics are set forth in Table III.

TABLES

Polymerization conditions and dispersion and terpolymer properties of Examples I–II and the Comparative Example are shown in Table I.

TABLE I

Ethylene/vinyl acetate/N-methylol acrylamide terpolymer dispersion

| | Example | | |
|---|---|---|---|
| | I | II | Comparative |
| Weight percent of ingredients used based on the weight of the terpolymer: | | | |
| "Aerosol" MA-80 [1] | 3.0 | 3.0 | 1.6 |
| "Aerosol" OT-75 [2] | 1.5 | 1.2 | 2.4 |
| "Triton" X-305 [3] | | 1.1 | |
| "Triton" X-100 [4] | | | 2.2 |
| "Natrosol" 300 L [5] | .06 | 0.4 | |
| $K_2S_2O_8$ | | 0.5 | |
| $(NH_4)_2S_2O_8$ | 0.42 | | 0.45 |
| $Na_2S_2O_5$ | | | 0.15 |
| $NaHCO_3$ | | 0.3 | |
| $(NH_4)_2HPO_4$ | 0.47 | | 0.2 |
| Polymerization conditions: | | | |
| Temperature, °C | 72 | 75 | 72 |
| Pressure, p.s.i | 500 | 500 | 500 |
| Vinyl acetate feed time in minutes | 120 | 120 | 120 |
| N-methylol acrylamide feed time in minutes | 150 | 135 | 120 |
| Emulsion properties: | | | |
| Weight percent of solids | 51.8 | 50.4 | 49.7 |
| pH | 4.8 | 5.0 | 3.7 |
| Brookfield viscosity in centipoises at 25° C. (60 r.p.m.) | 95 | 150 | 350 |
| Dispersed polymer properties: | | | |
| Wt. percent of ethylene | 14.1 | 14.0 | 13.8 |
| Wt. percent N-methylol acrylamide | 3.5 | 3.5 | 4.0 |
| Wt. percent of vinyl acetate | 82.4 | 82.5 | 82.0 |
| Inherent viscosity [6] | 0.94 | 1.20 | 1.18 |
| Curability: In general | Excellent | Good | Fair |

[1] Anionic surfactant—80% aqueous solution of sodium dihexylsulfosuccinate.
[2] Anionic surfactant—75% aqueous solution of sodium dioctylsulfosuccinate.
[3] Nonionic surfactant—octylphenylpolyether alcohol, about 30 ethylene oxide units per molecule.
[4] Nonionic surfactant—octylphenylpolyether alcohol, 9–10 ethylene oxide units per molecule.
[5] Stabilizing colloid—hydroxyethylcellulose.
[6] Determined at 30° C. using a 0.5% concentration in a 99:1 acetone-water solvent.

The degree of curing of the dispersions of Examples I–II and the Comparative Example is illustrated in Table II.

TABLE II

Curing of ethylene, vinyl acetate, N-methylol acrylamide terpolymer dispersion

| | Length of a 50 mm. long film after soaking it for 10 min. in toluene a 75° F.[1] | | |
|---|---|---|---|
| Example | I | II | Comparative |
| Cure condition: [2] | | | |
| No cure, mm | Broke | | 107 |
| 110° C. for 1 min., mm | 90 | | |
| 130° C. for 1 min., mm | 77 | | 94 |
| 150° C. for 1 min., mm | 72 | 88 | 90 |
| 150° C. for 3 min., mm | | 79 | |
| 150° C. for 5 min., mm | | | 85 |

[1] The shorter lengths result from an increased degree of cross-linking which is synonymous with improved curability.
[2] 4 to 5 mil thick films were cured in a forced air circulating oven. 0.1% of oxalic acid was added to the emulsion prior to casting the films.

Tables I and II clearly illustrate that improved ethylene, vinyl acetate, N-methylol acrylamide terpolymers are produced by the process of this invention. The terpolymers prepared by this invention have a better curability (i.e., greater cross-linkability) than comparable prior art terpolymers.

TABLE III

Effect of concentration of N-methylol acrylamide in aqueous solution

| | | | | Percent | | | | |
|---|---|---|---|---|---|---|---|---|
| Sample | Temp. in degrees C. | Pressure in p.s.i. | Time in min. | NMAM in soln. | Solids in emulsion | Dilution sludge in emulsion | Ethylene in terpolymer | Emulsion appearance [1] |
| 1 | 72–78 | 530 | 150 | 60 | 49.1 | 10.6 | 13.1 | Poor. |
| 2 | 67–80 | 530 | 155 | 60 | 50.1 | 8.0 | 13.9 | Do. |
| 3 | 74–76 | 530 | 150 | 60 | 49.7 | 6.0 | 13.0 | Do. |
| 4 | 72–78 | 530 | 160 | 30 | 49.7 | 2.9 | 15.0 | Good. |
| 5 | 75–77 | 530 | 160 | 30 | 49.8 | 4.7 | 14.4 | Do. |
| 6 | 74–75 | 530 | 165 | 30 | 49.7 | 3.3 | 14.4 | Do. |
| 7 | 75–76 | 530 | 155 | 10 | 50.4 | 1.7 | 15.2 | Do. |
| 8 | 75–76 | 530 | 165 | 10 | 50.2 | 1.3 | 14.7 | Do. |
| 9 | 75–76 | 530 | 150 | 10 | 49.6 | 0.3 | 14.7 | Do. |

[1] Emulsion appearance is a function of emulsion lumpiness.

NOTE.—All emulsions have a 3.5 weight percent N-methylol acrylamide content based on the total weight of the terpolymer.

What is claimed is:
1. In a process for preparing an aqueous dispersion of an ethylene/vinyl acetate/N-methylol acrylamide terpolymer wherein the monomers are copolymerized in an aqueous dispersion system under ethylene pressure in the presence of an emulsifying agent, the improvement comprising initially charging about 5–25 weight percent vinyl acetate based on the total weight of the system, continuously adding the remainder of the vinyl acetate so as to maintain the level of unreacted vinyl acetate monomer in the aqueous dispersion system at about 5–25 weight percent based on the total weight of the system at any given time until completion of the continuous vinyl acetate addition, during the continuous vinyl acetate addition also continuously adding N-methylol acrylamide in a substantially constant ratio to the vinyl acetate and at a rate substantially the same as the rate of polymerization, and continuously adding N-methylol acrylamide after completion of vinyl acetate addition.

2. The process as recited in claim 1 wherein the level of vinyl acetate monomer is maintained at about 15–25 weight percent from the start of polymerization until completion of vinyl acetate addition and said emulsifying agent is anionic.

3. The process as recited in claim 1 wherein said N-methylol acrylamide is continuously added after completion of vinyl acetate addition in decreasing amounts.

4. The process as recited in claim 3 wherein said N-methylol acrylamide is continuously added after completion of vinyl acetate addition in an amount decreasing proportionally to the amount of vinyl acetate monomer remaining in the dispersion system at a rate substantially the same as the rate of N-methylol acrylamide polymerization.

5. In a process for preparing an aqueous dispersion of an ethylene/vinyl acetate/N-methylol acrylamide terpolymer wherein the monomers are copolymerized in an aqueous dispersion system under ethylene pressure in the presence of an anionic emulsifying agent, the improvement comprising initially charging about 5–25 weight percent vinyl acetate based on the total weight of the system, continuously adding the remainder of the vinyl acetate so as to maintain the level of unreacted vinyl acetate monomer in the aqueous dispersion system at about 5–25 weight percent based on the total weight of the system at any given time until completion of the continuous vinyl acetate addition, during the continuous vinyl acetate addition also continuously adding N-methylol acrylamide in a substantially constant ratio to the vinyl acetate and at a rate substantially the same as the rate of polymerization, and continuously adding N-methylol acrylamide in decreasing amounts after completion of vinyl acetate addition.

References Cited
UNITED STATES PATENTS 3,345,318    10/1967    Lindemann et al. _ 260—29.6 TA
3,380,851    4/1968     Lindemann et al. ____ 117—140

WILLIAM H. SHORT, Primary Examiner

L. M. PHYNES, Assistant Examiner